United States Patent
Mast et al.

(10) Patent No.: US 9,464,393 B2
(45) Date of Patent: Oct. 11, 2016

(54) TWO STAGE SNOW THROWER AUGER HOUSING

(71) Applicant: Briggs & Stratton Corporation, Wauwatosa, WI (US)

(72) Inventors: James W. Mast, Sheboygan Falls, WI (US); Samuel J. Gerritts, Pewaukee, WI (US); Daniel L. Steinike, West Band, WI (US); Joseph D. Folk, Juneau, WI (US); Mark R. Starszak, Saukville, WI (US); James N. Jensen, Cascade, WI (US); Aaron E. Breitmeyer, Mequon, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 202 days.

(21) Appl. No.: 13/909,019

(22) Filed: Jun. 3, 2013

(65) Prior Publication Data

US 2014/0150302 A1    Jun. 5, 2014

Related U.S. Application Data

(63) Continuation of application No. PCT/US2012/020083, filed on Jan. 3, 2012.

(60) Provisional application No. 61/429,454, filed on Jan. 4, 2011, provisional application No. 61/434,460, filed on Jan. 20, 2011.

(51) Int. Cl.
*E01H 5/09* (2006.01)
*E01H 5/04* (2006.01)
*B21D 22/20* (2006.01)
*B23P 15/00* (2006.01)

(52) U.S. Cl.
CPC ............. *E01H 5/098* (2013.01); *B21D 22/20* (2013.01); *B23P 15/00* (2013.01); *E01H 5/045* (2013.01); *Y10T 29/49826* (2015.01); *Y10T 29/49885* (2015.01); *Y10T 29/49947* (2015.01)

(58) Field of Classification Search
CPC ............. E01H 5/045; Y10T 29/49885; Y10T 29/49826; Y10T 29/49947; B21D 22/20; B23P 15/00
USPC ................... 37/248, 249, 259, 444; 72/347
See application file for complete search history.

(56) References Cited

U.S. PATENT DOCUMENTS

| | | | | |
|---|---|---|---|---|
| 153,931 | A * | 8/1874 | Bushfield | 72/347 |
| 221,207 | A * | 11/1879 | Avery | 198/713 |
| 1,668,166 | A * | 5/1928 | McKee et al. | 37/398 |
| 3,078,603 | A * | 2/1963 | Ertsgaard et al. | 37/252 |
| 3,468,041 | A * | 9/1969 | Mattson et al. | 37/246 |
| 3,742,626 | A * | 7/1973 | Ellis | 37/260 |
| 4,110,921 | A * | 9/1978 | Poker, Jr. | 37/446 |
| 5,163,239 | A * | 11/1992 | Lampe | E01H 5/045 239/123 |
| 5,174,053 | A * | 12/1992 | Takeshita | 37/258 |
| 5,177,888 | A | 1/1993 | Thorud | |
| 5,203,102 | A * | 4/1993 | Motteli | 37/248 |

(Continued)

OTHER PUBLICATIONS

PCT international preliminary report on patentability for PCT/US 2012/020083 mailed on Jul. 18, 2013.

*Primary Examiner* — Jamie L McGowan
(74) *Attorney, Agent, or Firm* — Rathe Lindenbaum LLP

(57) ABSTRACT

A two stage snow thrower comprises an auger, and a snow discharge housing. The snow discharge housing comprises a one piece deep drawn auger housing.

16 Claims, 19 Drawing Sheets

(56) References Cited

U.S. PATENT DOCUMENTS

| | | | |
|---|---|---|---|
| 5,209,003 A * | 5/1993 | Maxfield et al. | 37/252 |
| 5,267,402 A * | 12/1993 | Russell et al. | 37/442 |
| 6,938,364 B2 * | 9/2005 | White et al. | 37/248 |
| 6,952,893 B1 | 10/2005 | Sanderson | |
| 7,698,839 B1 * | 4/2010 | Phillips et al. | 37/444 |
| 7,703,223 B2 * | 4/2010 | Walker et al. | 37/260 |
| 7,730,642 B2 * | 6/2010 | Sugiura | 37/257 |
| 8,240,070 B1 * | 8/2012 | Phillips et al. | 37/444 |
| 2002/0174572 A1 | 11/2002 | Prochnow et al. | |
| 2006/0150444 A1 * | 7/2006 | Friberg et al. | 37/244 |
| 2007/0022638 A1 * | 2/2007 | Sueshige | 37/260 |
| 2009/0183395 A1 | 7/2009 | Sugiura | |
| 2010/0058621 A1 * | 3/2010 | Harmelink | E01H 5/045 37/244 |

\* cited by examiner

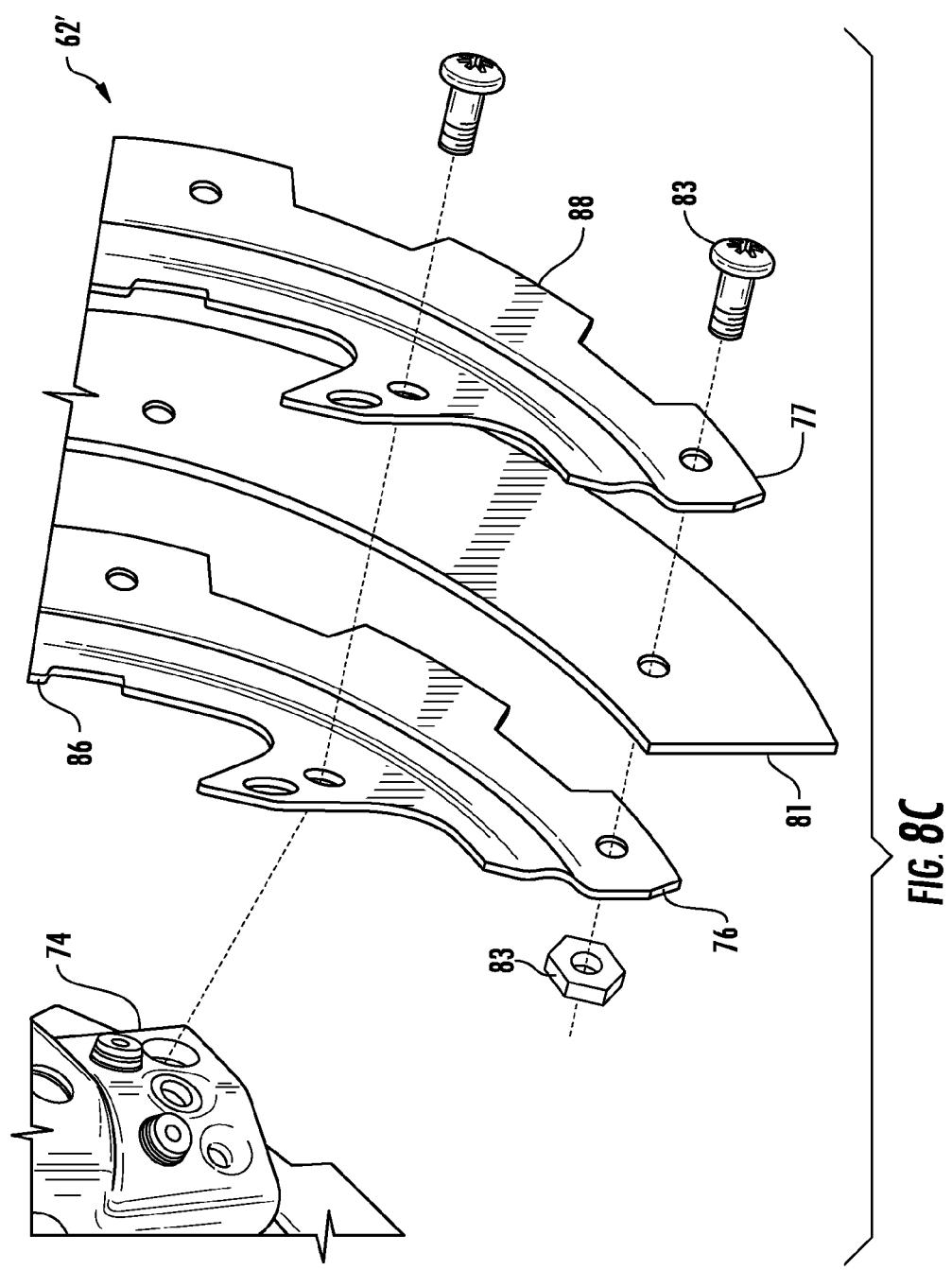

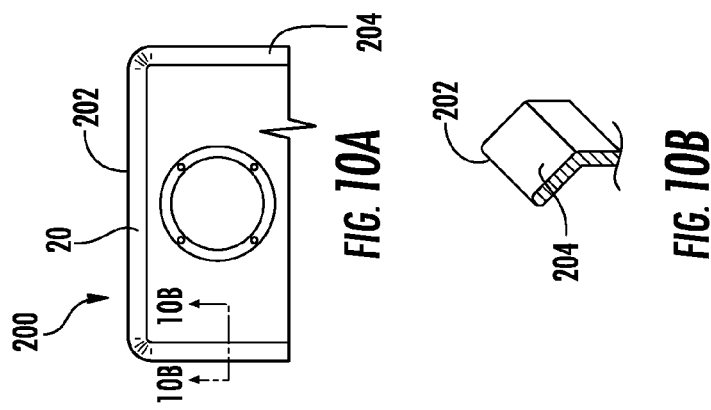
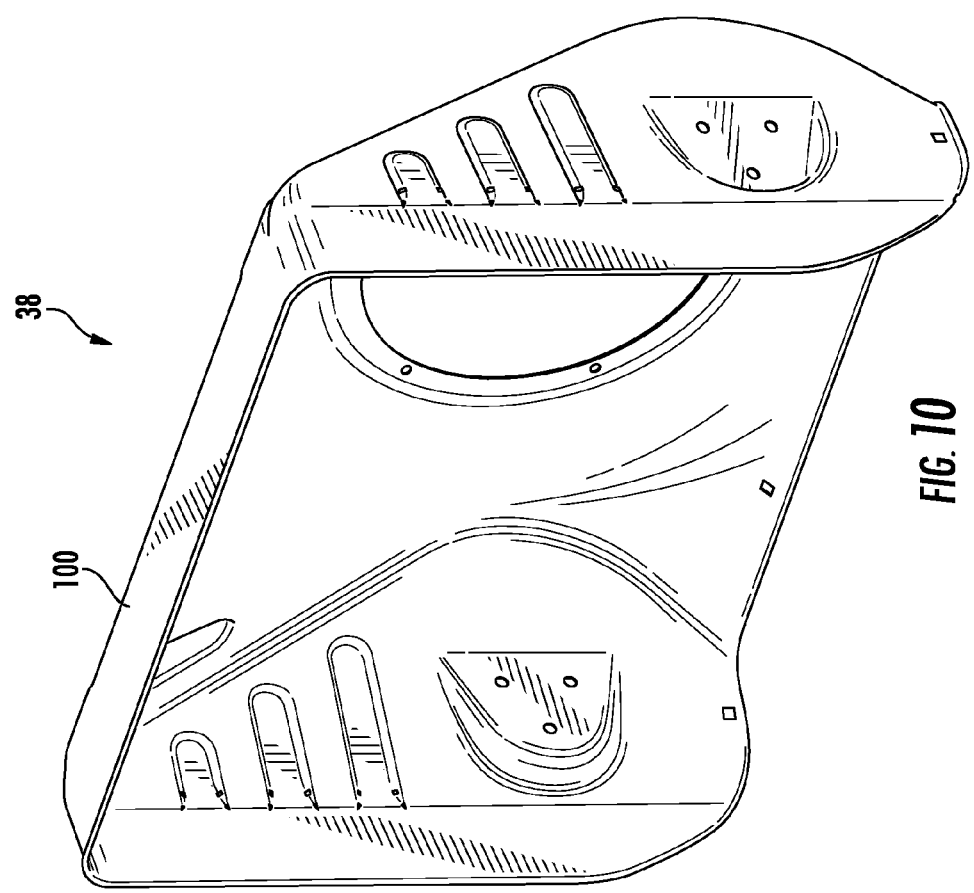

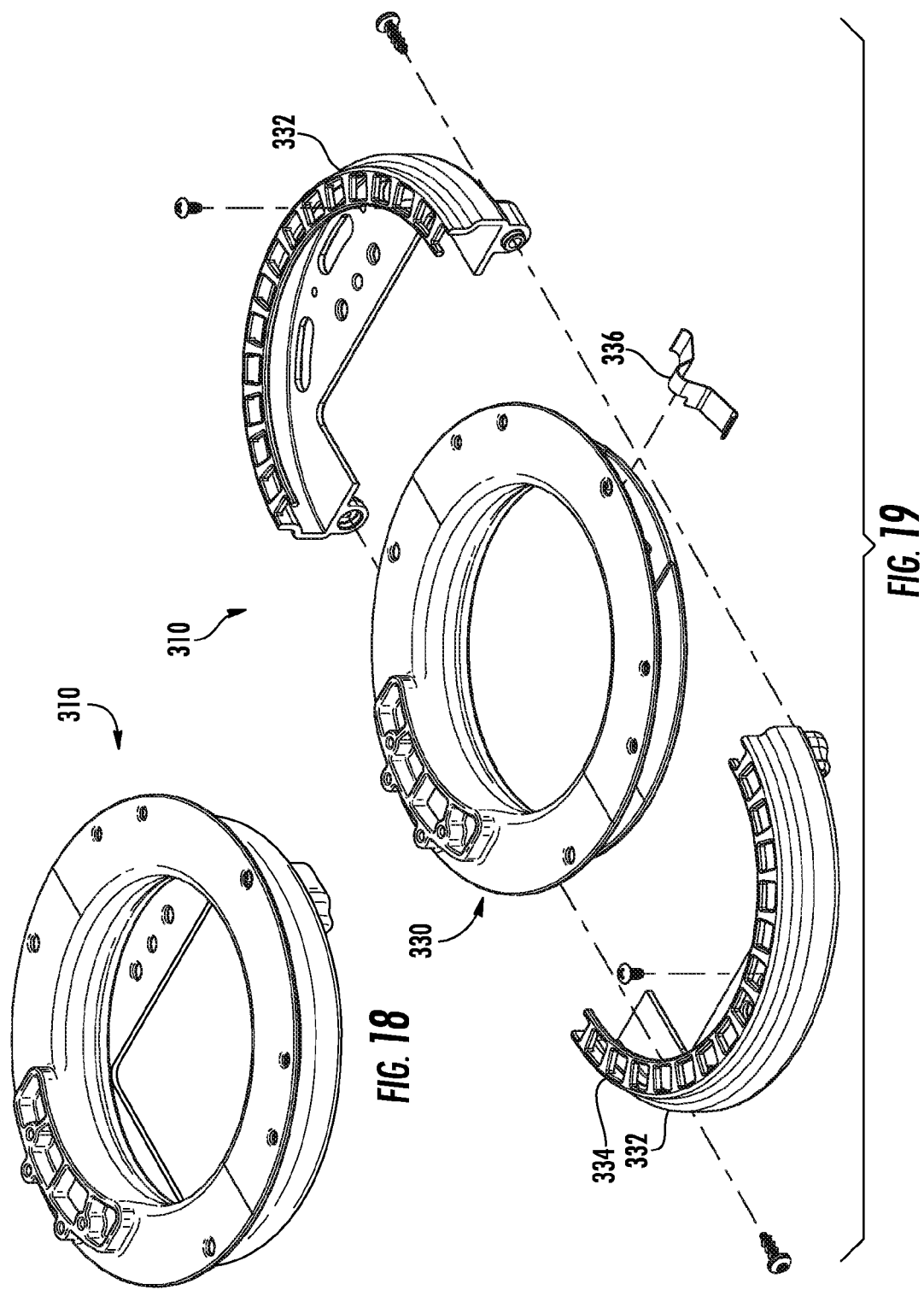

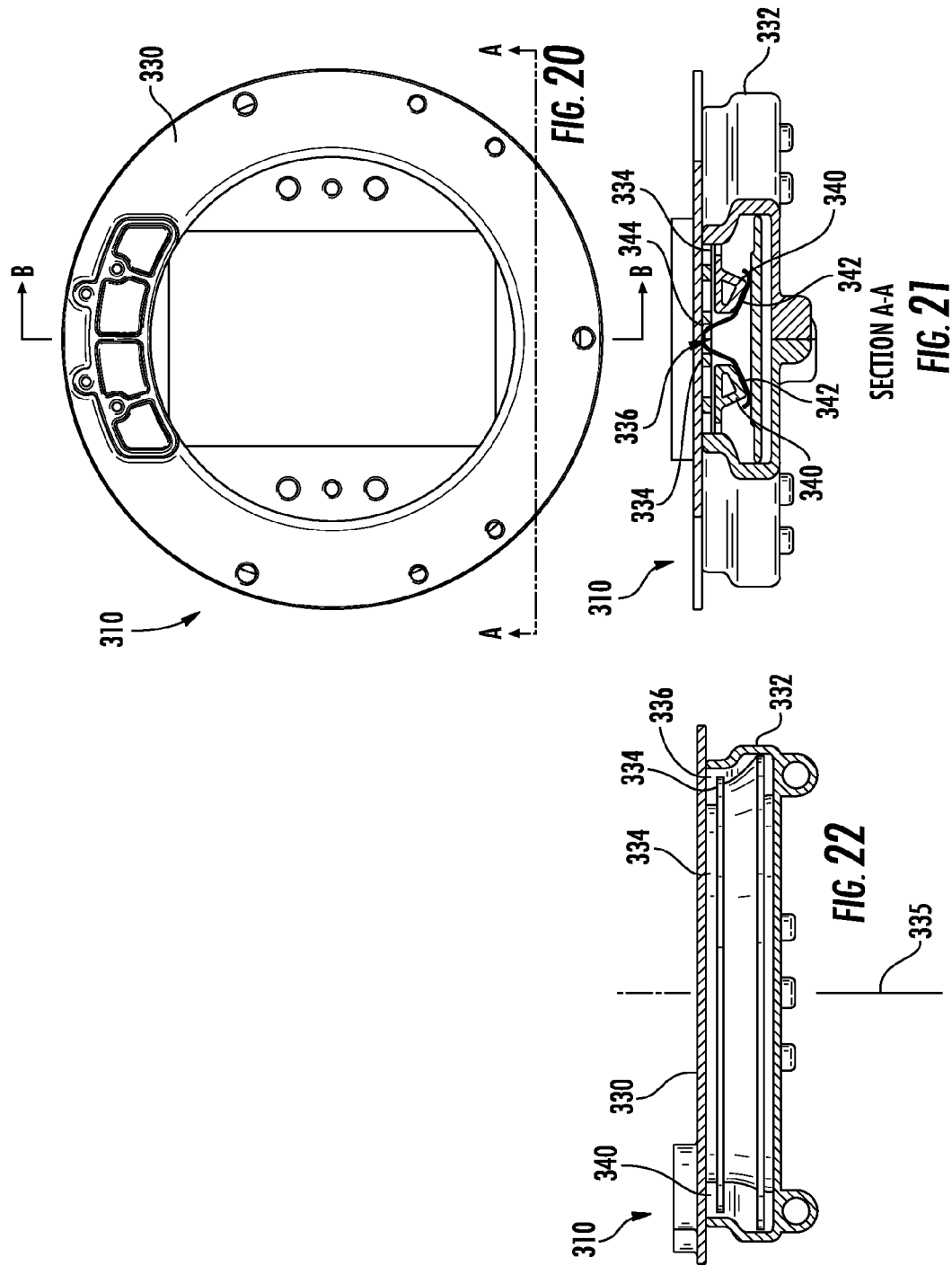

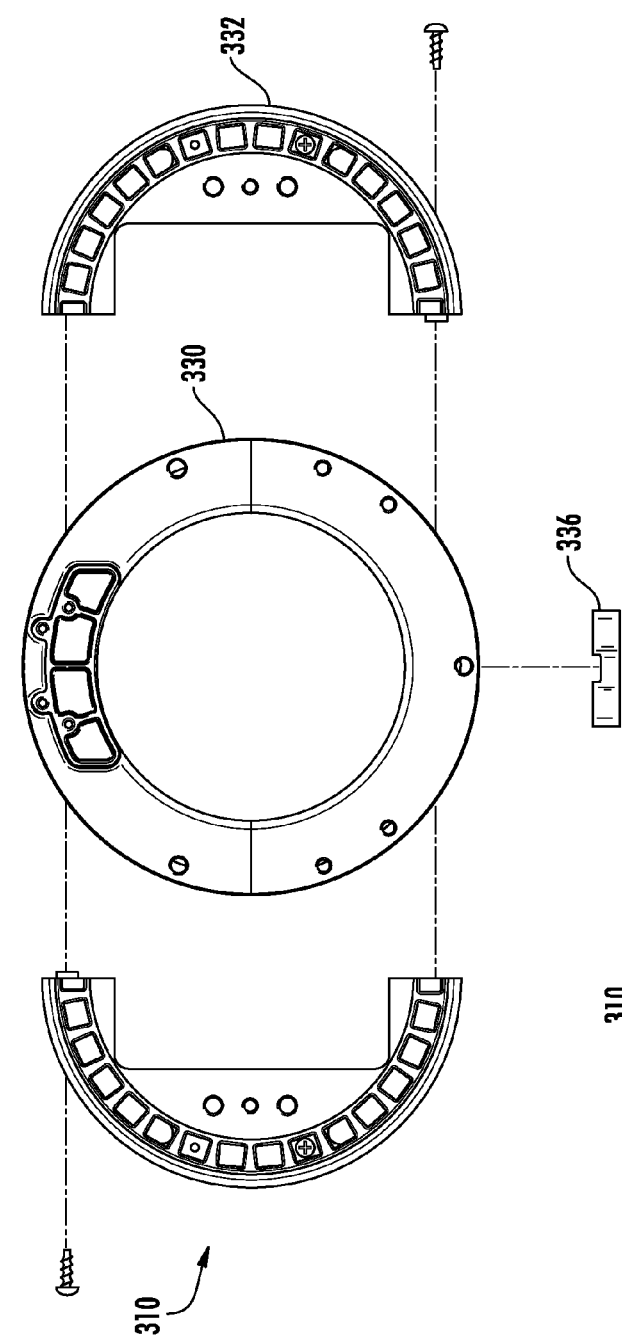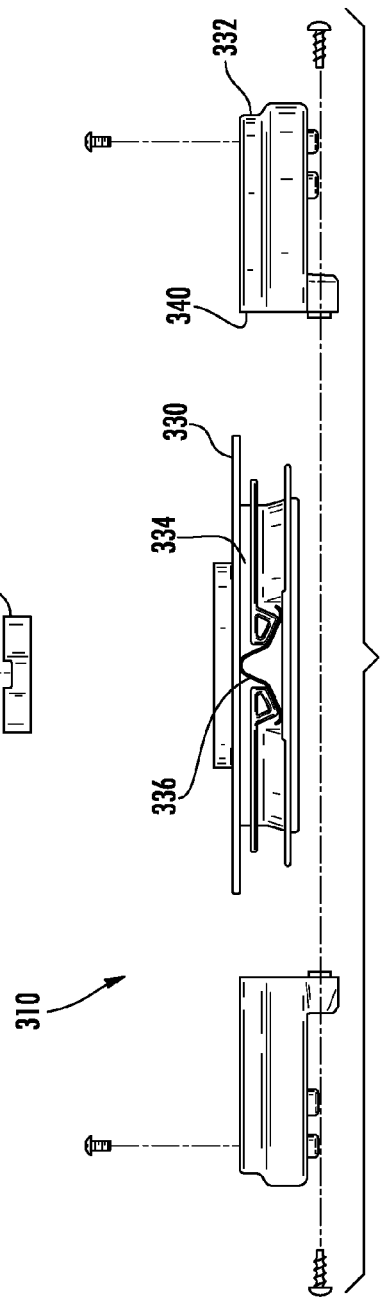

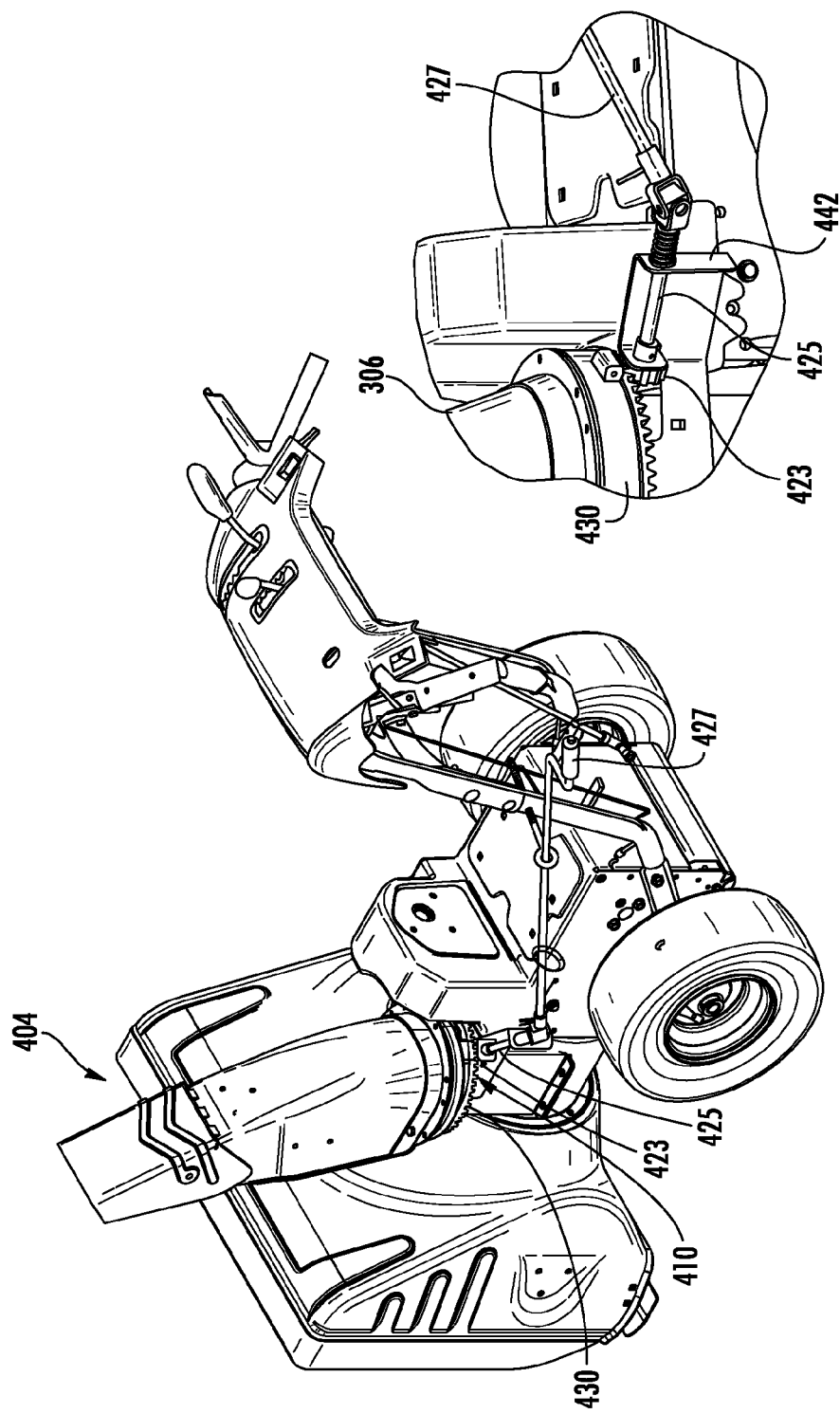

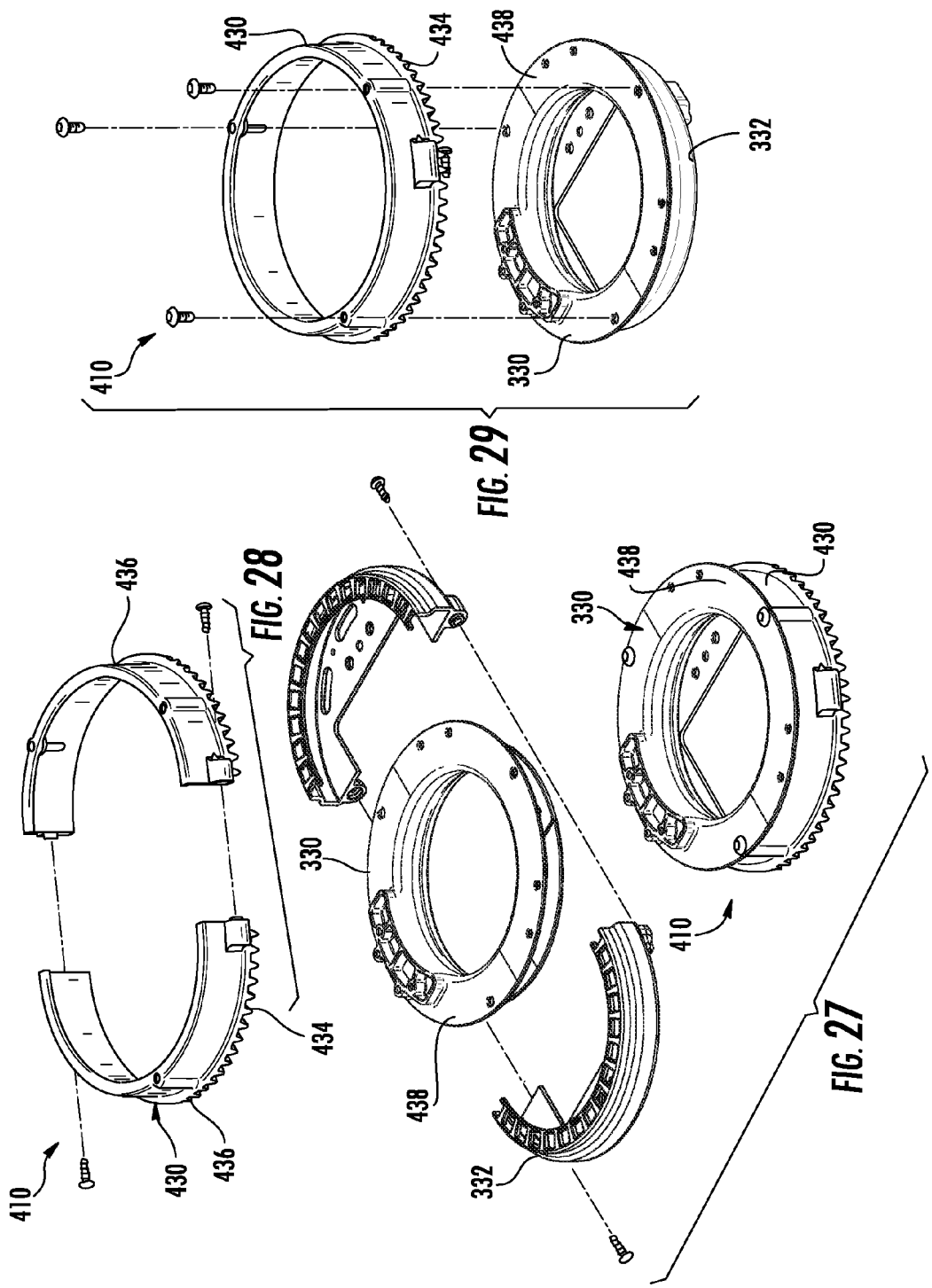

TWO STAGE SNOW THROWER AUGER HOUSING

CROSS-REFERENCE TO RELATED PATENT APPLICATIONS

The present application is a continuation application claiming priority under 35 USC Section 120 from co-pending application No. PCT/US 2012/020083 filed on Jan. 3, 2012 and entitled TWO STAGE SNOW THROWER CHUTE by Samuel J. Gerritts et al., full disclosure of which is hereby incorporated by reference. Application No. PCT/US 2012/020083 claims priority to U.S. Provisional application Ser. No. 61429454 filed on Jan. 4, 2011 by Daniel L. Steinike et al. and entitled TWO STAGE SNOW THROWER, the full disclosure of which is hereby incorporated by reference. Application No. PCT/US 2012/020083 claims priority to U.S. Provisional application Ser. No. 61434460 filed on Jan. 20, 2011 by Daniel L. Steinike et al. and entitled TWO STAGE SNOW THROWER CHUTE, the full disclosure of which is hereby incorporated by reference.

BACKGROUND

Two-stage snow throwers (also known as snow blowers) receive snow in an auger housing mouth, wherein auger further cuts the snow and transfer the snow to impeller with discharges a snow through a chute. Existing two-stage snow throwers utilize complex auger housings, augers, impeller housings and chutes, increasing the complexity and cost of the overall snow thrower.

BRIEF DESCRIPTION OF THE DRAWINGS

FIG. 8C is a fragmentary perspective view of another example auger flight assembly for the auger of FIG. 2.

FIG. 10 is a front perspective view of the auger housing of FIG. 9.

FIG. 10A is a fragmentary front elevational view of another implementation of the auger housing of FIG. 9.

FIG. 10B is a sectional view of the auger housing of FIG. 10A taken along line 10B-10B.

FIG. 18 is a perspective view of an example chute rotator assembly of the snow thrower of FIG. 17.

FIG. 19 is an exploded perspective view of the chute rotator assembly of FIG. 18.

FIG. 20 is a top elevational view of the chute rotator assembly of FIG. 18.

FIG. 21 is a sectional view of the chute rotator assembly of FIG. 20 taken along line A-A.

FIG. 22 is a sectional view of the chute rotator assembly of FIG. 20 taken along line B-B.

FIG. 23 is a top elevational exploded view of the chute assembly of FIG. 18.

FIG. 24 is a side elevational exploded of the chute rotator assembly of FIG. 20.

FIG. 25 is a rear perspective view of another implementation of the snow throwing FIG. 1.

FIG. 26 is an enlarged fragmentary perspective view of a portion of the snow thrower of FIG. 25.

FIG. 27 is an exploded perspective view of a chute rotator assembly of the snow thrower of FIG. 25.

FIG. 28 is a perspective view of an example drive adapter for the chute rotator assembly of FIG. 27.

FIG. 29 is an exploded perspective view of the chute rotator assembly of FIG. 27, partially assembled.

DETAILED DESCRIPTION OF THE EXAMPLE EMBODIMENTS

Figure 1:
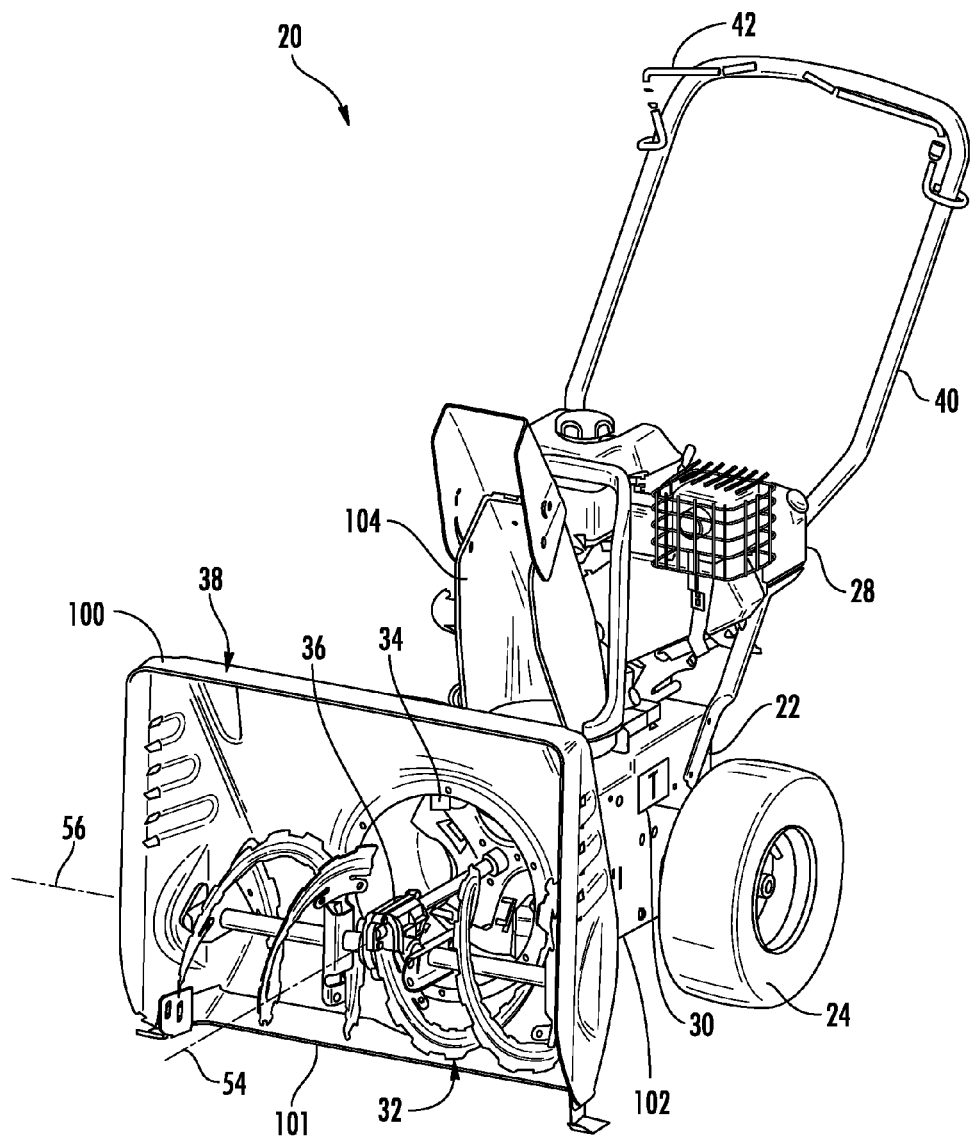
FIG. 1 is a front perspective view of an example two-stage snow thrower.

FIG. 1 is a front perspective view of a snow thrower 20 according to an example embodiment. As will be described hereafter, snow thrower 20 has an auger and a snow discharge housing that facilitate simplified and inexpensive manufacture with enhanced snow handling capabilities. Snow thrower 20 includes frame 22, axle 24, wheels 26, engine 28, drive transmission 30 (schematically shown), auger 32, impeller 34, snow discharge transmission 36 and snow discharge housing 38.

Frame 22 comprises one or more structures supporting the remaining components of snow thrower 20. In the example illustrated in which snow thrower 20 is a walk-behind snow thrower, frame 22 supports wheels 26, engine 28, drive transmission 30 (schematically shown), auger 32, impeller 34, snow discharge transmission 36 and snow discharge housing 38. Frame 22 further supports handles or grips 40 and controls 42. In other embodiments where snow thrower 20 comprises a riding snow thrower, frame 22 may additionally support a seat and may be supported by a greater number of wheels, inner rings or other ground propulsion members. In embodiments where snow thrower 20 is mounted to another vehicle, such as a lawnmower, all-terrain vehicle, truck or the like, frame 22 may or may not support axle 24 and wheels 26 and may be configured to be removably mounted to the vehicle. In embodiments where snow thrower 20 is powered by the engine or other torque source of the vehicle to which snow thrower 20 is mounted, frame 22 may not support an engine, such as engine 28, and may alternatively merely comprise a mounting structure or bracket supporting auger 32, impeller 34 and discharge housing 38 and facilitating their connection to the vehicle. Frame 22 may have a variety of different sizes, shapes and configurations depending upon the machine or method by which snow thrower 20 is moved across the terrain.

Wheels 26 are joined to an axle (not shown) so as to elevate and support frame 22 above the terrain 52. Wheels 26 further facilitate movement of snow thrower 20 across terrain 52. In the example illustrated, wheels 26 are rotationally driven to propel snow thrower 20. In other embodiments, wheels 26 may be physically pushed by a person or other vehicle. In some embodiments, wheels 26 may be replaced with one of more inner rings or other ground engaging members. In embodiments where snow thrower 20 is supported along the terrain by another vehicle, the axle as well as wheels 26 may be omitted.

Engine 28 comprises an internal combustion engine supported by frame 22 and operably coupled to wheels 26 by drive transmission 30 so as to drive wheels 26. Engine 28 is further operably coupled to auger 32 and impeller 34 by discharge transmission 36 so as to rotationally drive auger 32 about axis 56 and so as to rotationally drive impeller 34 about axis 54. In other embodiments, engine 28 may alternatively only drive auger 32 and impeller 34. In other embodiments, other mechanisms may be used to drive auger 32, impeller 34 or drive wheels 26.

Transmission 30 (schematically shown) comprises a series or arrangement of structures configured to transmit torque from engine 28 to wheels 26 via the axle. Likewise, auger transmission 36 comprises a series or arrangement of structures configured to transmit torque from engine 28 to auger 32 and impeller 34. Examples of such structures include, but are not limited to, drive shafts and driven shafts, chain and sprocket arrangements, belt and pulley arrangements, gear trains and combinations thereof. In one embodiment, transmission 36 is disposed on both sides of impeller 34, wherein transmission 36 extends between engine 28 and impeller 34 and wherein transmission 36 further extends between impeller 34 and auger 32. For example, in one embodiment, transmission 36 may include a bevel gear between impeller 34 and auger 32 for converting torque about axis 54 from impeller 34 to torque about axis 56 for auger 32.

Figure 2:
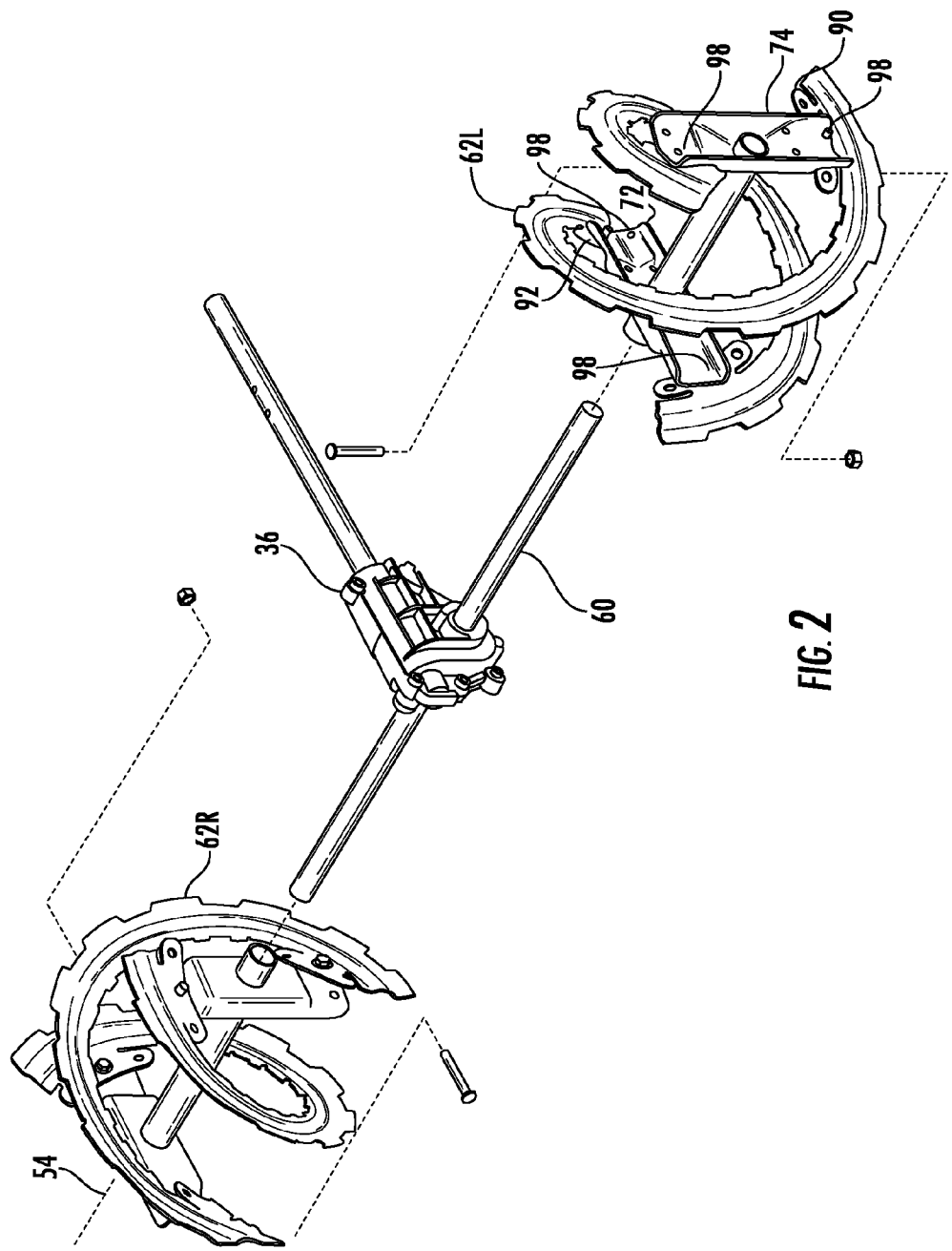
FIG. 2 is an exploded perspective view of an auger of the snow thrower of FIG. 1.

Auger 32 comprises a mechanism configured to slice or cut through snow and to direct or move such snow towards impeller 34. As shown by FIG. 2, auger 32 includes a central output shaft 60 operably coupled to order transmission 36 for being driven about axis 54 while supporting left and right auger flight assemblies 62R and 62L (collectively referred to as flight assembly 62). In the example illustrated, auger flight assemblies 62 are slid over output shaft 60 and are attached with one of more fasteners such as shear bolts and nuts. In other embodiments, auger flights 62 may be secured to shaft 60 in other manners or may be formed as part of output shaft 60.

Figure 3:
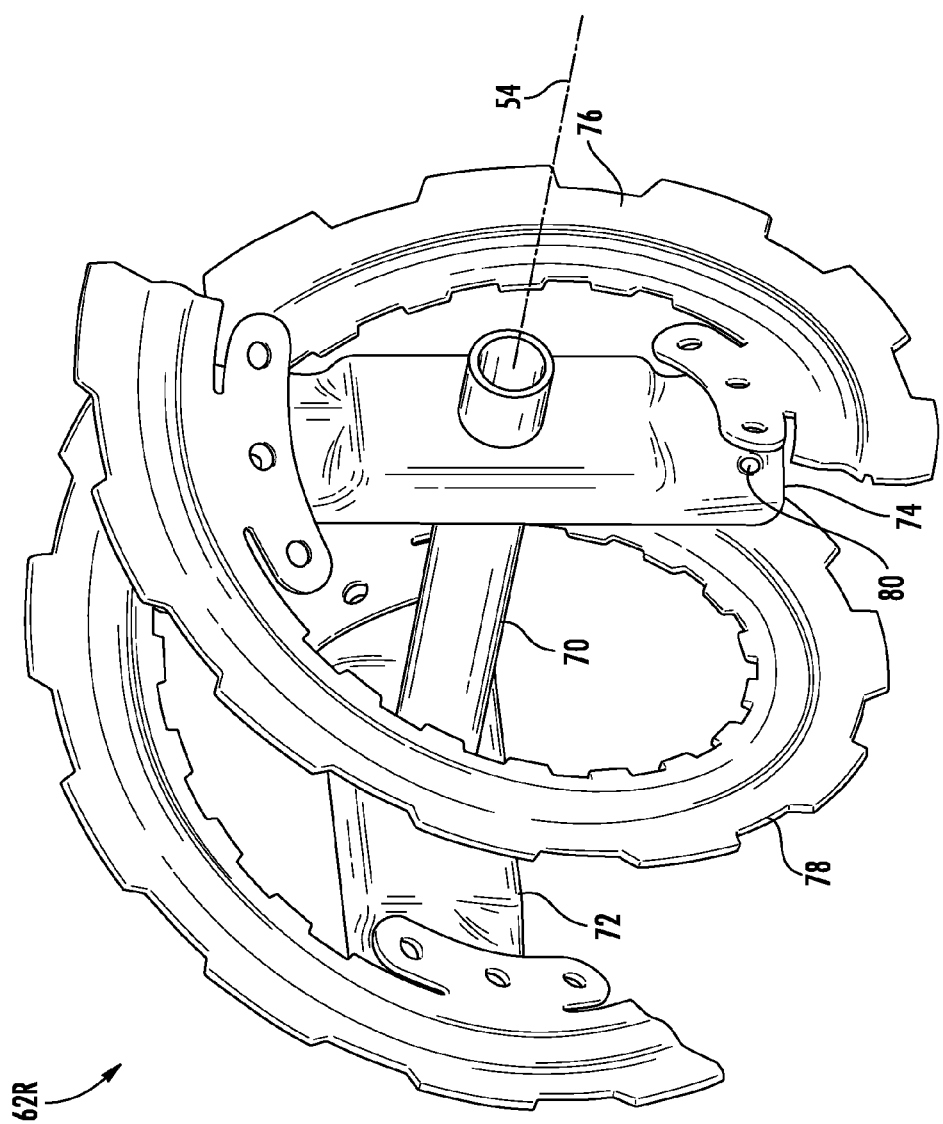
FIG. 3 is a perspective view of an auger flight assembly of the auger of FIG. 2.
Figure 6:
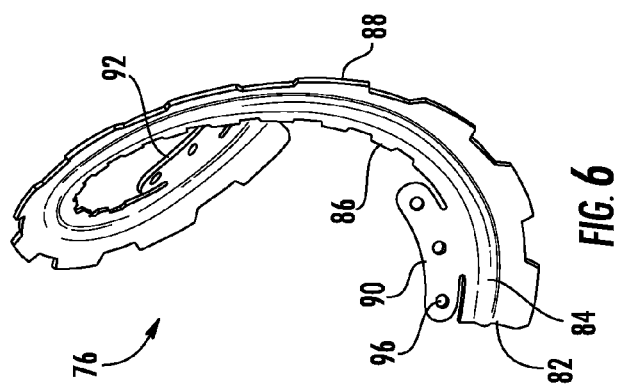
FIG. 6 is a right side elevational view of the auger flight of FIG. 4.
Figure 4:
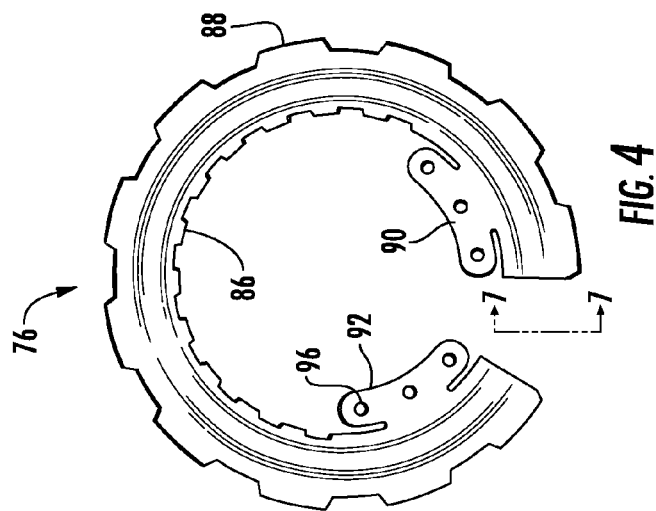
FIG. 4 is a front elevational view of an auger flight of the auger flight assembly of FIG. 3.
Figure 5:
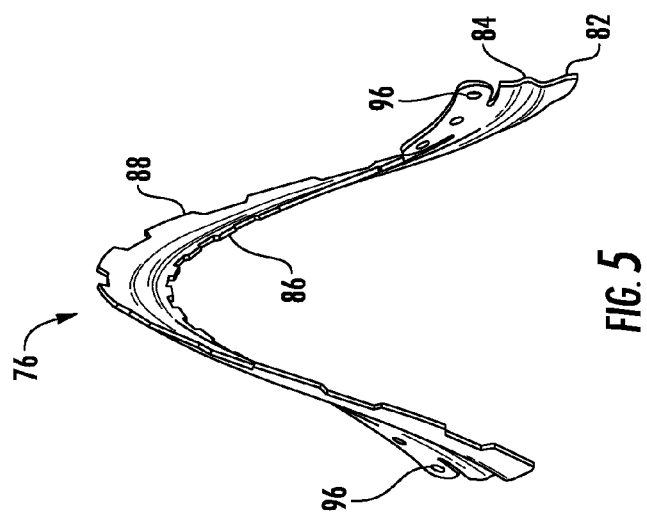
FIG. 5 is a left side elevational view of the auger flight of FIG. 4.

Auger flight assemblies 62 are substantially identical to one another but for the angular orientation of their respective flights or flight segments. FIG. 3 illustrates auger flight assembly 62R in more detail. As shown by FIG. 3, auger flight assembly 62R comprises auger support tube 70, flight supports 72, 74 and flight segments 76, 78. Auger support to 70 comprises a tube configured to be slid over output shaft 60 into secured job at shaft 60 as described above. Auger support tube 70 is coupled to and supports flight supports 72, 74.

Flight supports 72, 74 are located at opposite portions of auger flight tube 70. Flight supports 72, 74 comprise structures extending from auger support tube 70 and secured to auger flights 76, 78. An example illustrated, each auger flight supports them to come Sunday for comprises a bar adding apertures 80 by which faster than a secure flights 76, 78 to such supports 72, 74. In other embodiments, apertures 80 may be omitted where other fasteners or other securing methods are used to join or secure flights 76, 78 to supports 72, 74. In the example illustrated, flight supports 72, 74 are angularly offset with respect to one another about axis. In the example illustrated, supports 72, 74 are angularly offset by 90 degrees with respect to one another. In other embodiments, supports 72, 74 may have other angular orientation depending upon the number of flight segments and the length of assembly 62. Although flight 62 is illustrated as including two such supports, in other embodiments, flights and 62 may include greater than two supports.

FIGS. 4-8 illustrate flight segment or flight 76 in more detail. Flight 76 is substantially identical to flight 78 except for the different angular twisting of flight 76. As shown by FIGS. 4-8, auger flight 76 comprises blade 82, depression or gusset 84, inner teeth 86, outer teeth 88 and attachment flanges 90, 92. Blade 82 comprises a central portion of flight segment 76. Gusset 84 comprises a depression, deformity, channel or rib centrally extending along blade 82. Gusset 84 provides blade 82 with strength, allowing blade 82 to be formed from a less rigid, less expensive material or to have a thinner thickness.

Inner teeth 86 project from blade 82 towards support tube 70 (shown in FIG. 3). Inner teeth 86 extend along at least a majority of the inner edge of blade 82. Teeth 86 have a height sufficient such that teeth 86 assists in grinding ice or snow about support tube 70 for enhanced snow throwing. In other embodiments, teeth 86 may be omitted.

Figure 7:
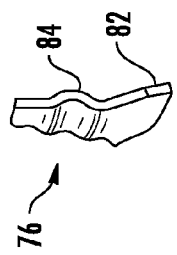
FIG. 7 is an and elevational view of the auger flight of FIG. 4 taken along line 7-7.

Outer teeth 88 project from blade 82 away from the centerline of flight assembly 62, away from axis 54 and away from support tube 70. Outer teeth 88 further assist in cutting through snow or ice. In the example illustrated, teeth 88 are angularly offset from blade 82 for enhanced cutting through snow. As shown by FIG. 7, in the example illustrated, teeth 80 are offset by about 20 degrees. In other embodiments, teeth 88 may have other offset angles. In other embodiments, teeth 88 may be omitted.

Attachment flanges 90, 92 extend from an inner edge of blade 82 and are configured to mount flight 76 to supports 72 and 74. In the example illustrated, each of flanges 90, 92 includes apertures 96 which are located size to align with apertures 80 of flight supports 72 and 74. As shown by FIG. 2, at least one fastener 98 secures or fastens flange 92 an inner surface of support 74 and flange 92 to another side of support 72. In the example illustrated, faster 98 comprises a self-threading screw. In other embodiments, fastener 98 may comprise other types of fasteners. In some bombings, fasteners 98 may be omitted where other fastening, clipping or welding methods are used for securement. In the example illustrated, each of flanges 90 and 92 includes a series of spaced apertures 96 to provide a plurality of space mounting locations to accommodate tolerances and fabrication variations. In other embodiments, flanges 90 and 92 may have a fewer or greater of such apertures or mounting locations.

As shown by FIGS. 2 and 3, flight segment 78 is similar to flight segment 76 except that flight segment 78 is twisted in an alternative direction. When mounted to supports 72 and 74, flight segments 76 and 78 interweave, overlap and partially wrap about one another.

Figure 8:
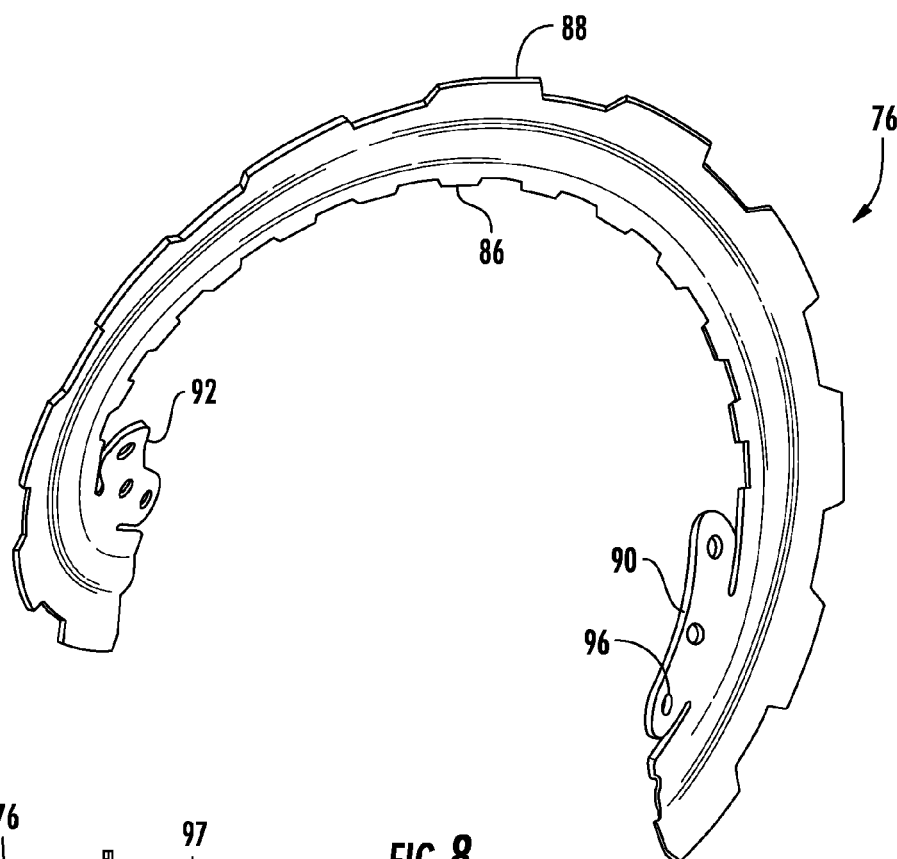
FIG. 8 is a perspective view of the auger flight of FIG. 4.
Figure 8A:
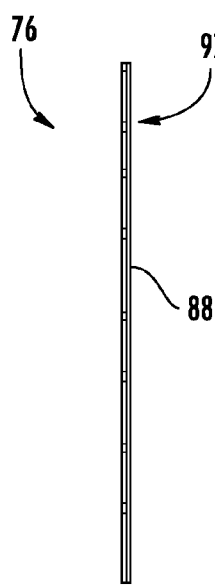
FIG. 8A is a side elevational view of an example stamped ribbon from which the auger flight of FIG. 4 is formed.
Figure 8B:
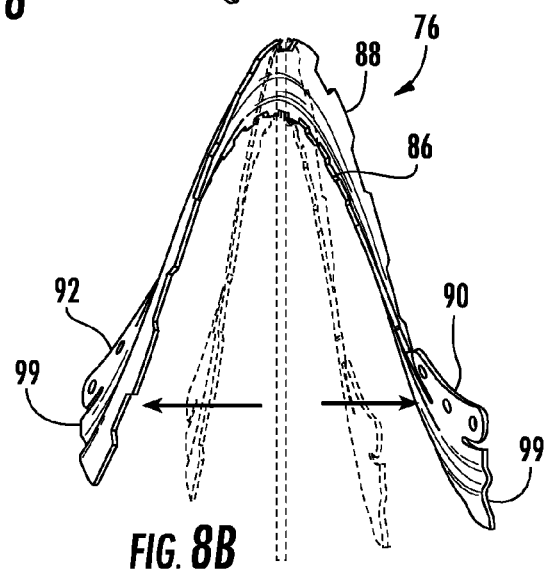
FIG. 8B is a side elevational view of the ribbon of FIG. 8A during the formation or bending to form the auger flight of FIG. 4.

According to one embodiment, flight segments 76 and 78 are formed from a flat annular ring or ribbon 97 (shown in FIG. 8A) stamped or cut from a sheet of material. The annular ring is less than 360 degrees, having two opposite ends. In one embodiment, the open opposite ends 99 (shown in FIG. 8B) are angularly spaced from one another by 30 degrees. In one embodiment, teeth 86, 88 and flanges 90, 92 are also stamped such that the entire flight is formed from a single unitary piece or sheet of material. Once stamped, as shown by FIGS. 8A and 8B, end portions 99 of the ribbon or ring 97 are engaged by a guy so as to press or pull away from one another in opposite directions along a center of outer ring, providing outer ring (flight segment 76) with a helical or coil shape.

According to one embodiment, each flight is formed from a 12 gage sheet of metal conforming to ASTM A569. In other embodiments, each flight segment may be formed in other fashions and from other materials.

FIG. 8C is an exploded fragmentary perspective view illustrating auger flight assembly 62', an alternative implementation of auger flight assembly 62. Auger flight assembly 62' is identical to auger flight assembly 62 except that auger flight assembly 62' additionally comprises auger flight segments 77 and elastomeric extensions 81. Auger flight segments 77 are substantially identical to auger flight segments 76 in shape and dimensions. Auger flight segments 77 cooperate with auger flight segment 76 to sandwich and capture elastomeric extension 81 therebetween. In the example illustrated, fasteners 83 interconnect auger flight segment 76, 77 with the elastomeric extension 81.

Elastomeric extensions 81 comprise elongate helical strips or bands of elastomeric material configured so as to be captured between auger flight segment 76, 77 and so as to project or extend outwardly beyond the outer edge of blade 82 and hourly beyond outer teeth 88. In one example, elastomeric extensions 81 sufficiently project beyond flight segment 76 so as to engage or contact the ground when snow thrower 20 is in a normal, at rest horizontal state on a horizontal terrain. As a result, elastomeric extensions 81 facilitate wiping or cleaning down to the ground when removing snow.

Although not shown, auger flight assembly 62' additionally includes auger flight segments which match auger flight segments 78 and which capture elastomeric extension therebetween. The additional elastomeric extension captured between auger flight segment 78 and the matching auger flight segment is identical to auger flight extension 81 shown in FIG. 8C except that the elastomeric extension has a helical shape in an opposite direction as compared to extension 81.

In other implementations, auger flight extensions 81 may be coupled to or joined to auger flight or auger flight segments 76 and 78 in other fashions. For example, in another implementation, auger flight extensions 81 may comprise elastomeric materials which are over molded onto flight segments 76, 78. In yet other implementations, auger flight 77 may be omitted, wherein auger flight extension 81 is mounted to one side of flight segment 76. In yet another example implementation, extension 81 and flight segments 76 may be configured to cooperate with one another so as to snap together for retaining extension 81 with respect to segment 76. For example, extension 81 may be provided with an elastomeric head portion that resiliently compressed or deform during insertion into a receiving cavity or clip provided on flight segment 76. Extension 81 may alternatively be joined to flight segment 76 a tongue and groove arrangements, wherein extension 81 is provided with one of a tongue and groove and wherein flight 76 is provided with the other of a tongue and groove to radially retain extension 81 with respect to flight segment 76.

In one implementation, elastomeric extension 81 are formed from rubber material. In yet another implementation, elastomeric extensions may be formed from an elastomeric polymer. Although illustrated as a imperforate continuous band or strip, in some other implementations, elastomeric extension 81 may comprise a series of elastomeric fingers, functioning more as a broom rather than a scraper.

Impeller 34 comprises a series of paddles or blades circumferentially arranged about axis 54 and configured to be rotationally driven about axis 54. Impeller 34 is configured to receive the snow gathered and directed to it by auger 32 and to further impel snow away from snow thrower 20.

Snow discharge housing 38 comprises one or more structures configured to guide and direct the movement and the discharge of snow. Snow discharge housing 38 includes auger housing 100, scraper bar 101, impeller housing 102 and discharge chute 104. Auger housing 100 forms the head of snow thrower 20 and partially extends about or partially surrounds auger 32. Auger housing 100 rotationally supports auger 32 for rotation about axis 56 which is perpendicular to axis 54 and the direction of forward travel.

Figure 11:
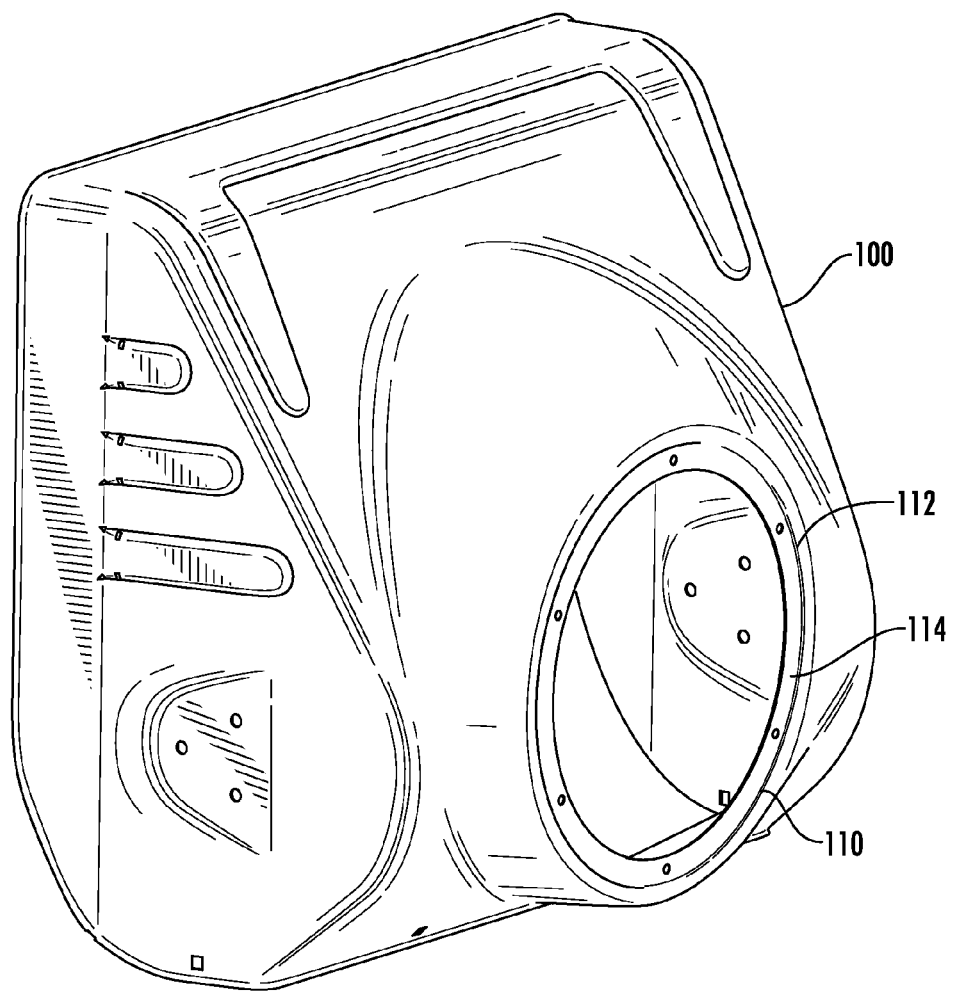
FIG. 11 is a rear perspective view of the auger housing of FIG. 9.
Figure 11A:
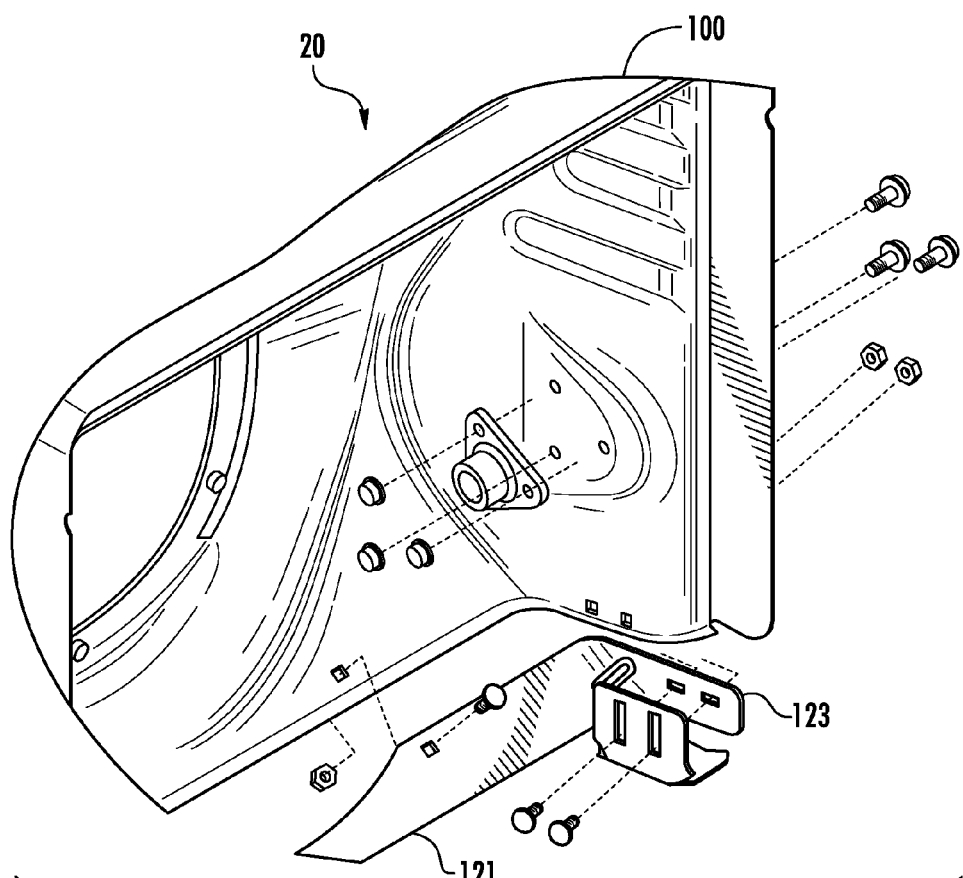
FIG. 11A is a fragmentary exploded perspective view of the snow discharge housing of the snow thrower of FIG. 1.

FIG. 11A illustrates scraper bar 101 in more detail. As shown by FIGS. 1 and 11, scraper bar 101 comprises an integral unitary body or bar which is bent so as to have a U-shape or C-shape. Scraper bar 101 is mounted to auger housing 100 on a lower portion of the mouth of auger housing 100 such that scraper bar 101 extends along a bottom edge and lower sides of auger housing 100 to not only serve as a scraper along the bottom edge of auger housing 100 but to also strengthen and rigidify auger housing 100.

As shown by FIG. 11A, in the example illustrated, scraper bar 101 has a lower scraping portion 121 and opposite side mounting portions 123 (one of which is shown). Scraping portion 121 extends along a bottom edge of auger housing 100 in a plane angle oblique to horizontal or the ground. Side mounting portions 123 project forwardly from scraping portion 121 so as to extend substantially parallel to the lower sides of auger housing 100. As a result, side mounting portion 123 rigidify strengthen the tangerine entire bottom forwardly extending length of auger housing 100 while allowing the forward edge of scraping portion 121 to the inset within the mouth of auger housing 100. In one implementation, scraper bar 101 has a thickness, strength or rigidity greater than that of the material forming auger housing 100 to further strengthen and rigidify auger housing 100.

Impeller housing 102 extends about impeller 34 and opens into an interior of auger housing 100. Impeller housing 102 further opens into chute 104. Impeller housing 102 cooperates with impeller 34 such that snow impelled or moved by impeller 34 is directed up and through chute 104.

FIGS. 9-13 illustrate auger housing 100 and impeller housing or can 102 in more detail. As shown by FIG. 10, auger housing 100 comprises a one piece drawn integral housing formed from a single sheet of stamped material, such as a single sheet of stamped metal. As a result, auger housing 100 may be quickly and easily manufactured, avoiding the need for extra process steps such as welds. By avoiding welding, housing 100 is structurally stronger and omits overlapping seams where oil may collect and would otherwise be difficult to remove through washing. As a result, housing 100 avoids problems of captured oil boiling during cooking or baking of subsequently applied paint coating, wherein the oil damages the paint coating coverage and finish.

As shown by FIG. 11, housing 100 includes a rear facing flange 110 includes a depression, recess or inset 112. Flange 110 has a face 114 extending in a direction non-parallel to the rotational axis 54 of impeller 34 as well as the centerline of impeller can 102.

Figure 9:
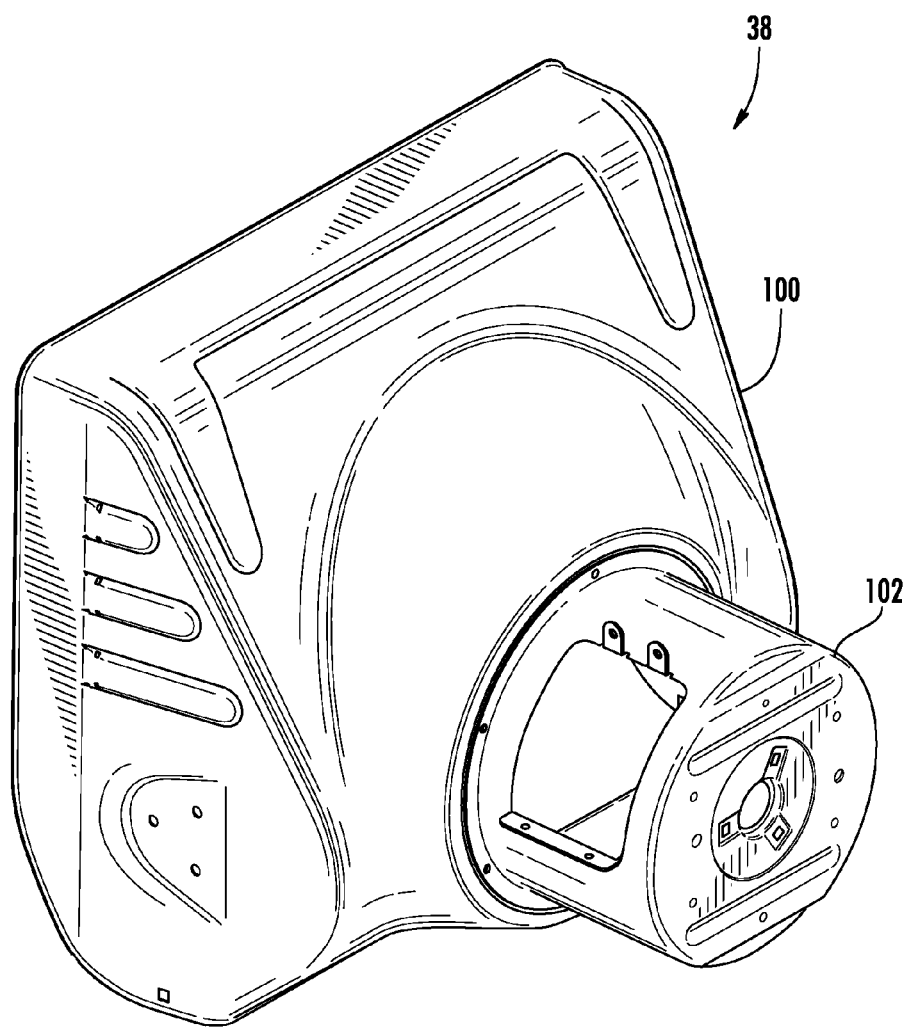
FIG. 9 is a rear perspective view of a snow discharge housing of the snow thrower of FIG. 1, the snow discharge housing including an auger housing and an impeller housing.
Figure 12:
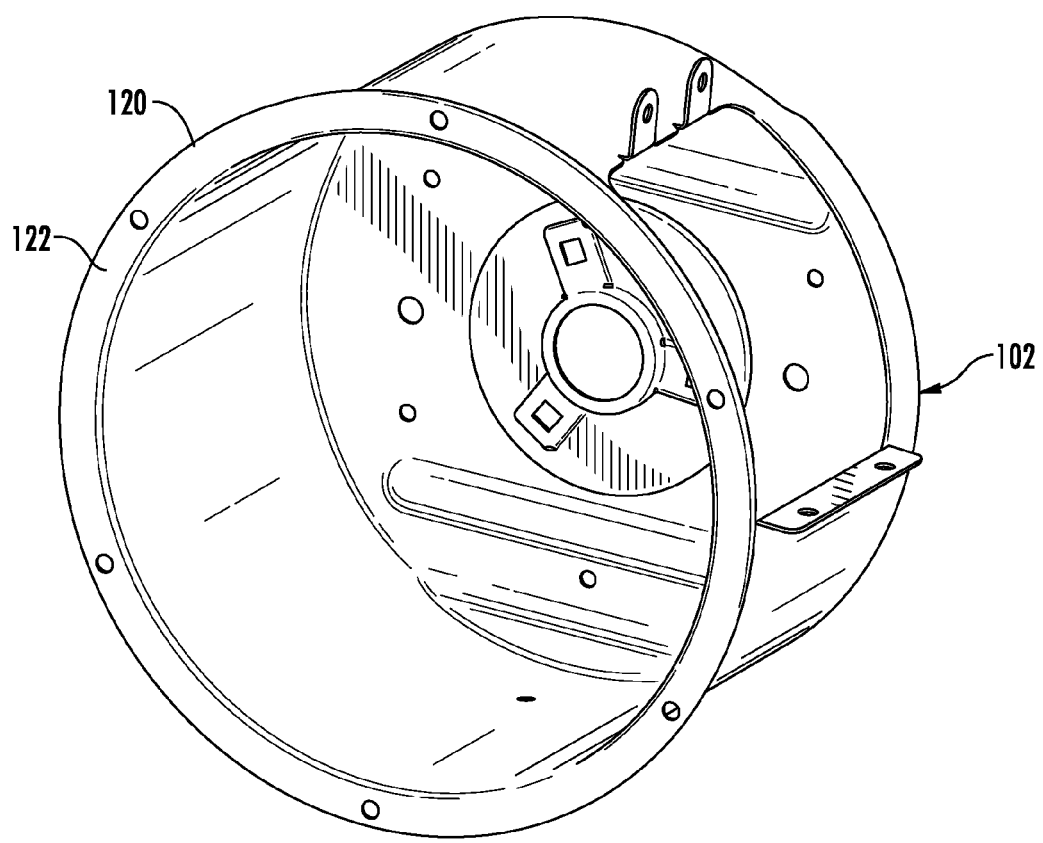
FIG. 12 is a rear perspective view of the impeller housing of FIG. 9.
Figure 13:
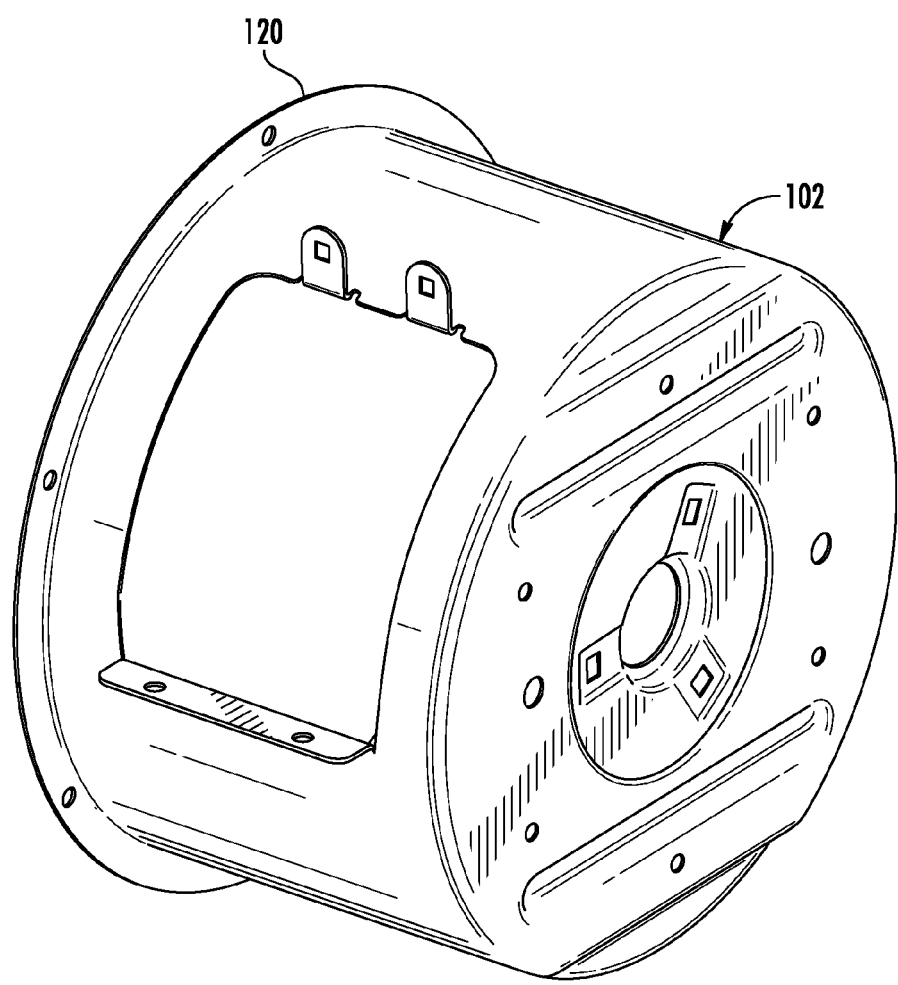
FIG. 13 is a front perspective view of the impeller housing of FIG. 9.

Impeller can 102 (also known as impeller housing 102) comprises a stamped and deep drawn structure configured to surround impeller 34 and to be attached to chute 104. As shown by FIGS. 12 and 13, impeller can 102 includes a flange 120 having a face 122. As shown by FIG. 9, when assembled, face 122 and flange 120 are received within inset 114 with face 122 abutting face 114. In the example illustrated, fasteners are passed through each of flanges 110 and 120 to secure impeller can 102 to a rear of auger housing 100. In other embodiments, flange 120 may be secured to flange 110 with other fasteners or in other manners.

In the example illustrated, each of auger housing 100 and can 102 are stamped, washed, painted and baked separately or individually. As a result, each of faces 112 and 122 are coated with paint across a majority, if not entirety, of the faces prior to faces 112 and 122 being placed in contact and abutment with one another. Because the juncture of auger housing 100 and can 102 avoids overlapping seams for welding, the juncture of auger housing 100 and can 102 avoids problems associated with captured lubrication stamping oil that is not washed away prior to painting and baking and it may damage the subsequent paint coating. Consequently, the finished appearance of housing 38 is enhanced, assembly is simplified and cost is reduced.

FIG. 10A illustrates auger housing 200, another embodiment of auger housing 100. As shown by FIG. 10A, because auger housing 200 is formed from a single sheet of deep drawn material as auger housing 100, auger housing 200 may be provided with an outwardly flared or bent mouth 202 having hourly bent or flared portions 204. FIG. 10B is a fragmentary sectional view illustrating a flared mouth 202. During the drawing process, the guides are outwardly moved to form the mouth and provide the mouth with the flared out portions 204. As a result, auger housing 200 has an enlarged cutting area formed from the same sheet of material.

Chute 104 comprises one or more structures configured to receive snow impelled by impeller 34 and to direct such snow away from snow thrower 20. In the example illustrated, chute 104 is configured to be selectively rotated about a substantially vertical axis such that snow may be blown or thrown to either transverse side of snow thrower 20 and at various rear and forward angles with respect to snow thrower 20. In one embodiment, chute 104 is configured to be manually rotated about a vertical axis. In other embodiments, such rotation may be powered. In yet other embodiments, chute 104 may be stationary.

Figure 14:
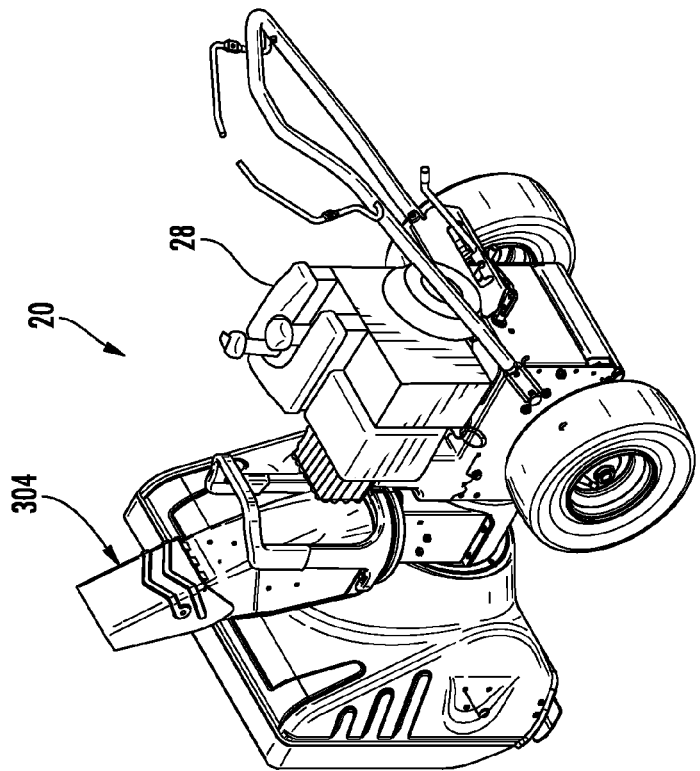
FIG. 14 is a rear perspective view of the snow thrower of FIG. 1.
Figure 16:
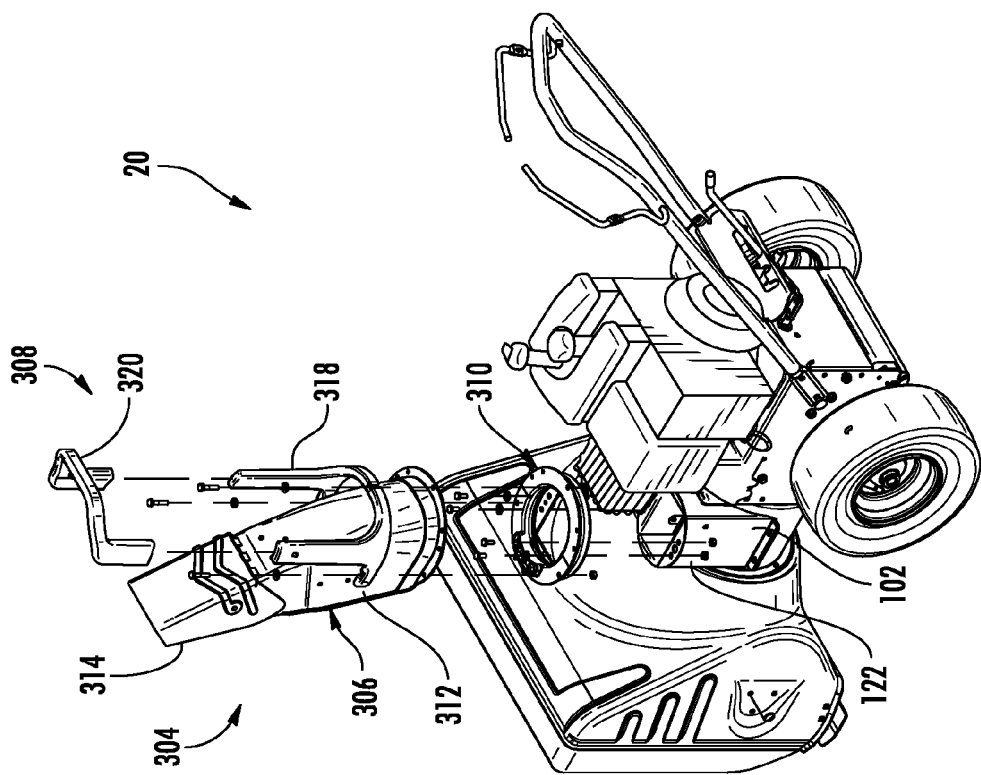
FIG. 16 is a rear perspective view of the snow thrower of FIG. 1 with a chute assembly exploded.
Figure 15:
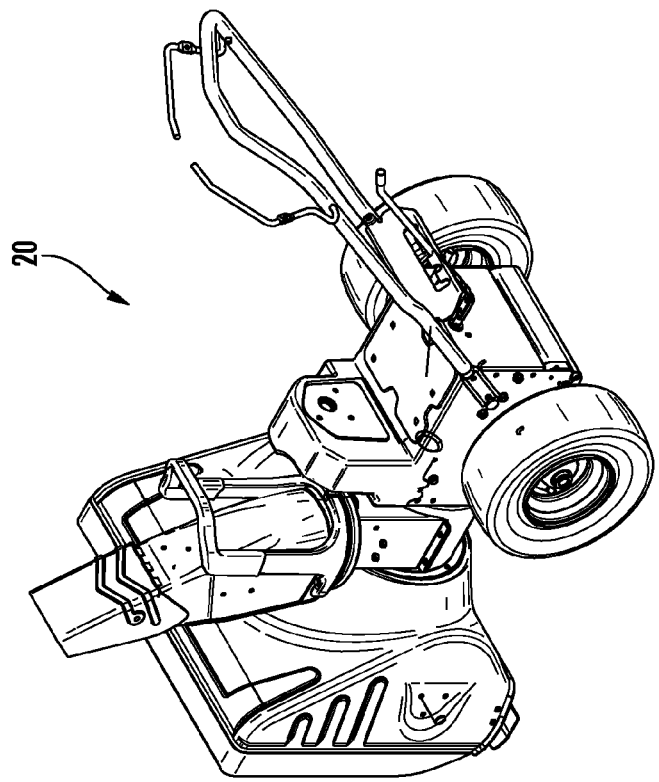
FIG. 15 is a rear perspective view of the snow thrower of FIG. 14 the portions omitted for purposes of illustration.
Figure 17:
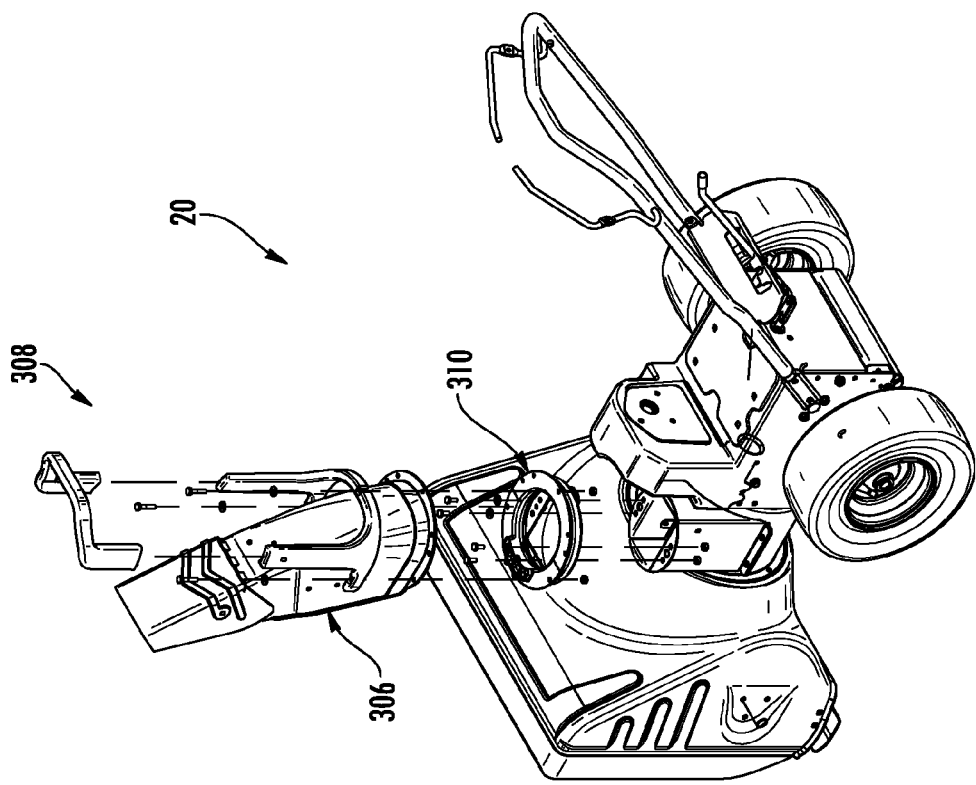
FIG. 17 is a rear perspective view of the snow thrower of FIG. 14 the portions omitted for purposes of illustration.

FIGS. 14-24 illustrate chute 104 in more detail. FIG. 14 is a rear perspective view of snow thrower 20. FIG. 15 is a rear perspective view of snow thrower 20 omitting engine 28 for ease of illustration. FIGS. 16 and 17 are exploded rear perspective views of snow thrower 20. As shown by FIGS. 16 and 17, chute 104 comprises chute assembly 306, handle assembly 308 and rotator assembly 310. Chute assembly 306 comprises one or more structures forming a conduit or piping for directing the flow of snow thrown by impeller 34. Although illustrated as comprising a lower main section 312 and an adjustable end or spout 314, in other embodiments, chute assembly 306 may alternatively comprise a single section or may include more than two sections. Chute assembly 306 is rotationally coupled to impeller housing 102 by rotator assembly 310 and is configured to be rotated with respect to housing 102 through the use of handle assembly 308.

Handle assembly 308 comprises one or more structures facilitating gripping of chute assembly 306 and rotation of chute assembly 306. Handle assembly 308 includes lower handle 318 and upper handle 320. Lower handle 318 mounts to chute assembly 306. Upper handle 320 mounts to lower handle 318 and provides a surface by which handle assembly 308 may be manually gripped. In other embodiments, other handles may be provided for manipulating and rotating chute assembly 306.

Rotator assembly 310 serves as an interface between chute assembly 306 and the mounting bracket 322 extending from housing 302. Rotator assembly 310 further serves as a bearing mechanism by which chute assembly 306 may be rotated about a substantially vertical axis with respect to housing 102 and a remainder of snow thrower 20.

FIGS. 18-24 illustrate rotator assembly 310 in more detail. FIG. 18 illustrates rotator assembly 310 in an assembled state. FIG. 19 is an exploded perspective view of rotator assembly 310. FIG. 20 as a top plan view of rotator assembly 310. FIG. 21 is a sectional view of rotator assembly 310 taken along line A-A of FIG. 20. FIG. 22 is a sectional view of rotator assembly 310 taken along line B-B of FIG. 20. FIG. 23 is an exploded top plan view of rotator assembly 310. FIG. 24 is a side elevational view of the rotator assembly room 310 of FIG. 23 in an exploded state.

As shown by FIGS. 18-24, rotator assembly 310 comprises inner ring 330, outer ring 332, detents 334 (also referred to as rotation stops) and projection 336. Inner ring 330 comprises one or more structures mounted or coupled to chute assembly 106 (shown in FIG. 16) which rotate relative to outer ring 332. As shown by FIG. 22, inner ring 330 includes an annular groove or track 334 which slidably receives portions of outer ring 332. Track 334 guides rotation of inner ring 330 and chute assembly 106 about axis 335. Although illustrated as a continuous uninterrupted channel extending continuously about axis 335, in other embodiments, track 334 may alternatively be provided by a plurality of spaced tabs or projections angularly spaced from one another about axis 335.

Outer ring 332 comprises one or more structures coupled to or fixed to bracket 322 of housing 102 and extending about inner ring 330, wherein outer ring 332 includes a projection 340 extending into track 334 and moving along track 334 as inner ring 330 rotates relative to outer ring 332. In the example illustrated, outer ring 332 is formed by two clamshell halves or portions which are joined to one another about inner ring 330. In other embodiments, outer ring 332 may have other configurations.

Detents 334 comprise openings, indents, notches, depressions, voids or other cavities formed in outer ring 332 which are configured to releasably receive a portion of projection 336 encircle axis 335 and a plurality of predefined locations. Although illustrated as comprising rectangular openings extending completely through portions of outer ring 332, in other embodiments, detents 334 may comprise depressions are notches only partially projecting into portions of outer ring 332.

Projection 336 comprises a structure supported and retained by inner ring 330 that is configured to releasably or removably project into one or more of detents 334. Projection 336 comprises a structure that is movable between a locking position or state in which projection 336 is received and projects into one or more of detents 334 and a released state our position in which projection 336 is withdrawn from one or more of the detents 334. Projection 336 is resiliently biased towards the locking position or state.

In the example illustrated, projection 336 comprise a single integral unitary structure. In other embodiments, projection 336 may comprise multiple components. In the example illustrated, projection 336 comprises a leaf spring mounted to inner ring 330. In other embodiments, projection 336 may comprise a separate pin, latch or other structure resiliently biased by separate spring, such as a separate leaf spring or a separate compression spring. In yet other embodiments, projection 336 may comprise a structure interrelate formed as part of a single unitary body with inner ring 330. For example, projection 336 may comprise a leaf spring supporting a pin or other structure configured to project into detents 334, wherein the leaf spring and the pin are integrally formed as part of a single unitary body with inner ring 330.

As shown by FIG. 21, inner ring 330 comprises a pair of mounting flanges 140 which capture wings 142 of projection 336 while allowing a nose 344 of projection to project at least partially into one of detents 334. When rotator assembly 110 is assembled, outer ring 332 surrounds ring 330 to capture and maintain projection 336 in place beneath flanges 140. As a result, projection 336 may be assembled and retained within rotator assembly 110 without projection 336 being fastened, welded, bonded or adhered by adhesive. Consequently, assembly is facilitated. In other embodiments, projection 336 may have other configurations and may be secured to inner ring 330 and in locking engagement with detents 334 in other fashions.

During rotation of chute assembly 306, nose 344 of projection 336 is compressed or forced away from detents 334. In other words, the leaf spring of projection 336 is resiliently deformed to a more flat and state, allowing nose to be withdrawn from detents 334 and allowing inner ring 330 and the associated chute assembly 106 to be rotated relative to outer ring 332 and the chute housing 102.

Although inner ring 330 is illustrated and described as being associated with chute assembly 106 while outer ring 332 is associated with or secured to impeller housing 102, in other embodiments, this relationship may be reversed. Although projection 336 is illustrated and described as being secured to inner ring 330 while detents 334 are associated with outer ring 332, in another embodiment, these relationships may be reversed. In other words, in another embodiment, projection 336 may alternatively be associated with outer ring 332 while detents 334 are associated with inner ring 330. Although rotator assembly 310 is illustrated as having a single projection 336, in other embodiments, rotator assembly 310 may be provided with multiple projections 336 about axis 335. Although inner ring 330 is illustrated and described as providing a groove or track 334 which slidably receives one or more extensions, projections or tabs 140 of outer ring 332, in other embodiments, inner ring 330 may alternatively include the projections or tabs 340 while outer ring 332 includes one or more grooves which serve as one or more tracks for slidably guiding tabs 340 during rotation about axis 335.

Overall, rotator assembly 320 provides a rotation interface between chute assembly 306 and impeller housing 102 that is inexpensive, less complex and more easily assembled as compared to current snow thrower chute rotation interfaces. In the example illustrated, rotator assembly 310 is formed from four main parts: inner ring 330, the two halves forming outer ring 332 and projection 336. Rotator assembly room 310 is efficiently assembled, not requiring fasteners for projection 336. In addition, rotator assembly 310 provides a plurality of discrete angular positions at which chute assembly 306 may be positioned and retained.

FIGS. 25-29 illustrate chute 404, another embodiment of chute 104. FIGS. 25 and 26 illustrate chute 404 provided as part of snow thrower 20 in place of chute 104. Chute 404 is similar to shoot 104 except that chute 404 includes rotator assembly 410 in place of rotator assembly 310, drive gear 423, drive linkage 425 and crank 427 (shown in FIG. 26). Rotator assembly 410 is similar to rotator assembly 310 except the rotator assembly 410 additionally includes a drive adapter 430.

FIG. 27 is a perspective view of rotator assembly 410. FIG. 28 is an exploded perspective view of rotator assembly 410. FIG. 29 is a partially assembled, partially exploded perspective view of rotator assembly 410. As shown by FIG. 28, rotator assembly 410 includes inner ring 330 (described above), outer ring 332 (described above) and drive adapter 430. Although rotator assembly 410 is illustrated as including the same inner ring 330 and outer ring 332 described above, in other embodiments, rotator assembly 410 may include a similar inner ring 330 but omitting any structures for mounting a projection whereas outer ring 332 may omit detents 334.

Drive adapter 430 comprises one or more structures configured to be mounted to inner ring 330 or the particular ring which is mounted to chute assembly 306. In the example illustrated, drive adapter 430 comprises a toothed collar having teeth 434 configured to be engaged by corresponding teeth of drive gear 423 (shown in FIG. 26). In the example illustrated, drive adapter 430 comprises two gear halves 436 which are joined to one another about and below the topmost rim 438 of inner ring 330. In other embodiments, drive adapter 430 may alternatively comprise a single ring which is slid over and about outer ring 332 while being connected to inner ring 330. Overall, drive adapter 430 facilitates the upgrade of the manually rotatable chute assembly 306 to be manually driven chute assembly using one or more gears.

As shown by FIGS. 25 and 26, drive gear 423 comprises a pinion gear or spur gear rotationally supported in meshing engagement with teeth 434 of drive adapter 430. Drive linkage 425 comprise a shaft rotatably supported by a bracket 442 which is connected to crank 427 crank 427 is rotationally supported such that a person may manually rotate crank 4272 drive gear 423 and rotate chute assembly 306. In other embodiments, a motor or other power source may be optimally coupled to drive linkage 425 or drive gear 423 so as to provide powered rotation of chute assembly 306.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The invention claimed is:

1. A two stage snow thrower comprising:
a one piece deep drawn auger housing having a mouth, wherein the auger housing omits welds and is formed from a single deformed sheet of material;
an auger supported from opposite sides of the housing;
an impeller can extending from the housing;
an impeller within the can; and
a chute extending from the impeller can, wherein the impeller is supported for rotation about an axis, wherein the auger housing includes a rear opening and a first flange having a first face extending non-parallel to the axis about the opening and inwards towards the axis to an inner edge defining the rear opening and wherein the impeller can includes the second flange having a second face extending non-parallel to the axis in abutment with the first face.

2. The snow thrower of claim 1, wherein the first face and the second face are each coated with a layer of paint.

3. The snow thrower of claim 1 further comprising at least one fastener extending through the first flange and the second flange.

4. The snow thrower of claim 1, wherein one of the first flange and the second flange has a depression receiving the other of the first flange and the second flange.

5. The snow thrower of claim 1 further comprising a bent C-shaped bar coupled to the auger housing so as to serve as a scraper and to strengthens the mouth of the housing.

6. The snow thrower of claim 1, wherein the first face of the first flange is recessed within a rear of the auger housing.

7. The snow thrower of claim 1, wherein a rear of the auger housing is frusto-conical about an upper portion of the opening.

8. A method comprising:
providing a single sheet of material;
deep drawing the single sheet of material in at least one die to form a one piece auger housing having a bottom portion, a top portion, a central portion between the bottom portion and the top portion, a first side portion and a second side portion opposite the first side portion, wherein the auger housing includes a rear opening and a first annular flange having a first face extending about the opening and inwards towards the rear opening to an inner edge defining the rear opening and wherein the method further comprises securing a second face of a second flange of an impeller can in abutment with the first face, wherein the first face and the second face extend non-parallel to a centerline of the impeller can.

9. The method of claim 8 further comprising coating the first face and the second face with paint prior to securing the first face and the second face in abutment with one another.

10. The method of claim 8, wherein securing the first face in abutment with the second face comprises fastening the first flange to the second flange.

11. The method of claim 10, wherein fastening the first flange to the second flange comprises inserting one or more fasteners through the first flange and the second flange.

12. The method of claim 8 further comprising positioning one of the first flange and the second flange in a recess in the other of the first flange and the second flange.

13. The method of claim 8, wherein during deep drawing of the auger housing, a mouth of the auger housing is flared outwardly to increase a snow cutting area of the mouth of the auger housing.

14. The method of claim 8 further comprising rotatably supporting an auger within the auger housing.

15. The method of claim 8, wherein the first annual flanged is recessed in a rear of the auger housing.

16. The method of claim 8, wherein a rear of the auger housing is frusto-conical about an upper portion of the opening.

* * * * *